United States Patent [19]

Fage

[11] Patent Number: 4,930,308
[45] Date of Patent: Jun. 5, 1990

[54] DOUBLE-FLOW TURBOSHAFT ENGINE WITH VARIABLE CONFLUENT NOZZLE

[75] Inventor: Etienne Fage, Jouy en Josas, France

[73] Assignee: The Dee Howard Co., San Antonio, Tex.

[21] Appl. No.: 339,874

[22] Filed: Apr. 18, 1989

Related U.S. Application Data

[63] Continuation of Ser. No. 77,301, Jul. 24, 1987, abandoned.

[30] Foreign Application Priority Data

Aug. 11, 1986 [FR]  France .............................. 86 11590

[51] Int. Cl.$^5$ .............................................. F02K 3/02
[52] U.S. Cl. ........................................ 60/262; 60/264; 60/271; 181/215; 239/265.19
[58] Field of Search ................ 60/262, 264, 271, 242; 239/265.33, 265.19, 127.3, 265.37; 181/215, 220

[56] References Cited

U.S. PATENT DOCUMENTS

| | | | |
|---|---|---|---|
| 3,055,174 | 9/1962 | Grotz et al. | 181/215 |
| 3,543,877 | 12/1970 | Ranvier et al. | 181/215 |
| 3,557,830 | 1/1971 | Raw | 60/262 |
| 3,721,314 | 3/1973 | Hoch et al. | 181/215 |
| 4,362,015 | 12/1982 | Fage | 60/262 |
| 4,581,890 | 4/1986 | Giraud | 60/262 |

FOREIGN PATENT DOCUMENTS 801355 12/1968 Canada .............................. 181/215

Primary Examiner—Donald E. Stout
Attorney, Agent, or Firm—Pollock, Vande Sande & Priddy

[57] ABSTRACT

This invention relates to a double-flow turboshaft engine with confluent nozzle, i.e. of the type having a central generator emitting via its outlet orifice a flow of hot gas and an annular bypass duct which surrounds the central generator and through which passes a bypass flow of relatively cold gas, the gas flows being freely confluent within the nozzle which extends the annular duct in convergent manner beyond the outlet orifice of the central generator, wherein it includes controlled means for momentarily varying on the periphery the passage of the flux of relatively cold gas in the annular bypass duct, with a view to compensating, at least partly, the degradation of the performances of the turboshaft engine when they are limited either by the maximum operational temperature of the central generator or by the maximum power of the engine, but not by these two conditions simultaneously.

9 Claims, 2 Drawing Sheets

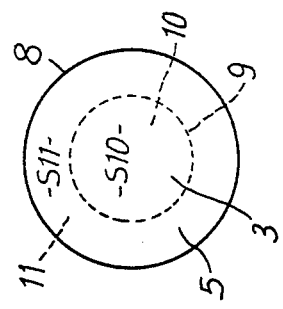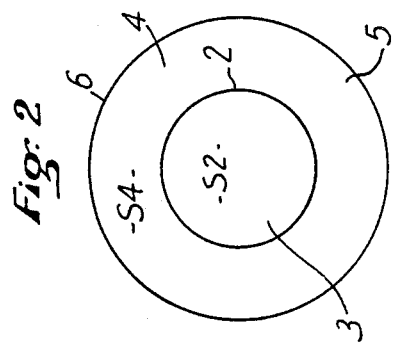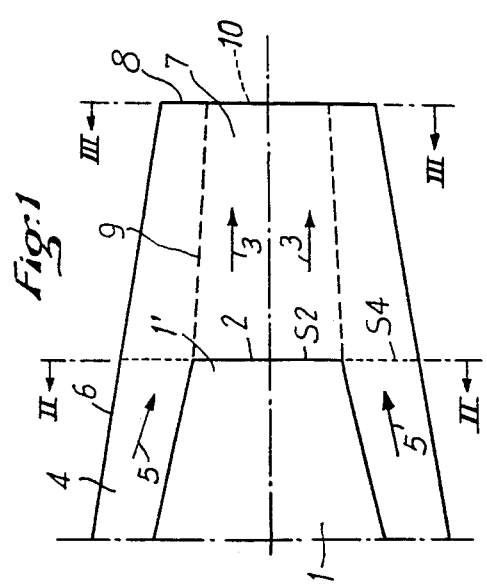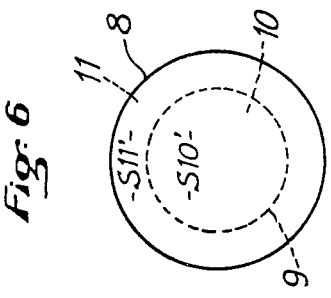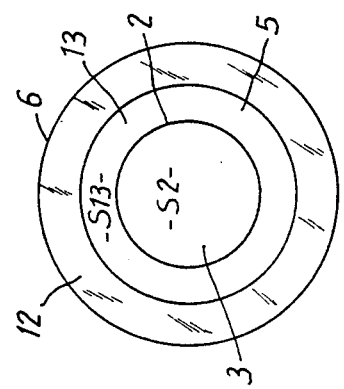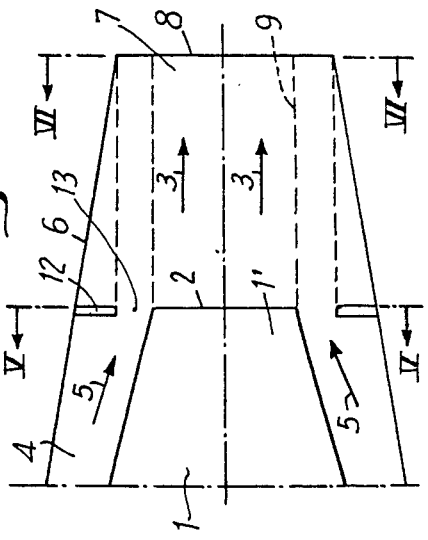

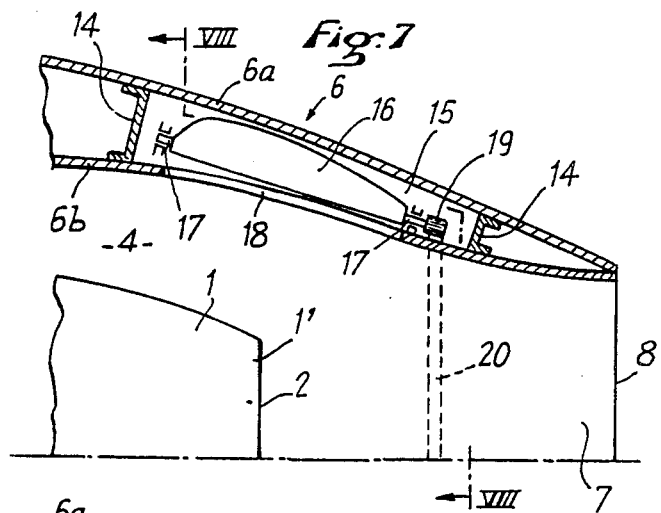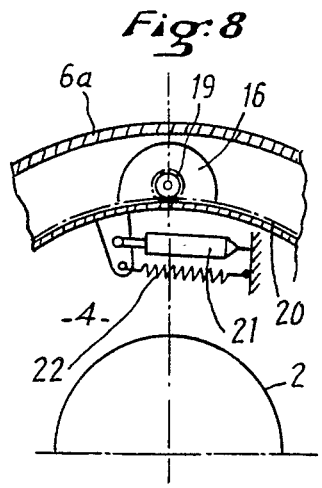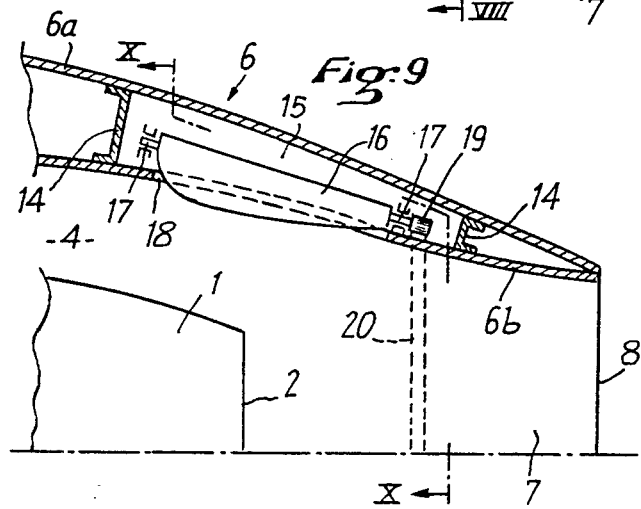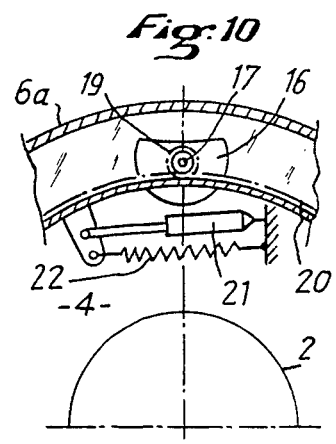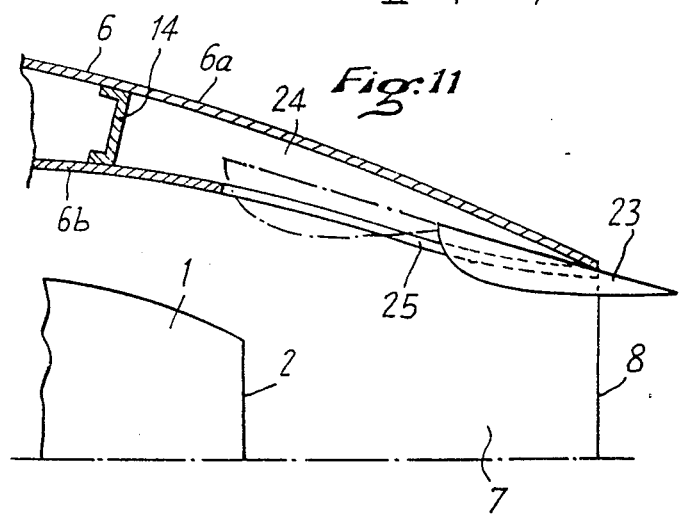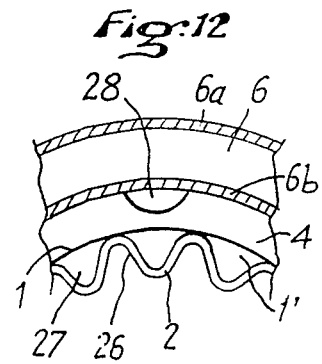

DOUBLE-FLOW TURBOSHAFT ENGINE WITH VARIABLE CONFLUENT NOZZLE

This application is a continuation of Ser. No. 077,301, filed on July 24, 1987, now abandoned.

FIELD OF THE INVENTION

The present invention relates to a double-flow turboshaft engine especially intended for the propulsion of aircraft and, more particularly, to an improvement to the exhaust pipe of such an engine.

BACKGROUND OF THE INVENTION

A double-flow turboshaft engine is known to comprise a central generator emitting a flow of hot gas and an annular bypass duct (fan channel) surrounding said central generator and through which passes a bypass flow of relatively cold gas coming from a fan. Such a turboshaft engine is equipped, more and more often, with a single nozzle which extends said annular duct outwardly beyond the outlet of said central generator and inside which the two flows, hot and cold, are freely confluent. In such a so-called confluent or compound nozzle, the hot flow from the central generator is surrounded by the cold bypass flow coming from the fan.

Since, within the confluent nozzle, there is no solid surface separating the two flows, the respective final sections of the flows at the outlet of said common confluent nozzle result not only from the geometry thereof, but also from the equilibrium of the pressures along the fluid surface (interface) separating the two flows. It will be readily understood that if, for example, the pressure of the cold bypass flow increases, the hot central flow will have to be compressed radially: in that case, the final annular section of the cold flow will thus increase, whilst the final central section of the hot flow will decrease.

For a given engine, these variations in relative sections will, of course, depend on the conditions of operation of said engine, such as speed and altitude of the aircraft and temperature of the ambient air, as well as on the position of the throttle lever and they do not coincide exactly with the optimum dimensions enabling the best possible performances of the engine to be obtained.

It will be noted that, for most uses, such relative variations in section of flow with respect to ideal sections giving the best performances are not too detrimental, as they are partly compensated by the versatility of the double-flow engines.

However, the maximum thrust developed by these engines generally corresponds either to the obtaining of a limiting operational temperature, or to a limiting speed of rotation (limiting power), these two limits being only exceptionally concomitant. Thus, in the particular, important, case of the thrust upon take-off at high ambient temperature, this thrust is currently defined by the limiting temperature, whilst the speed of rotation is clearly less than the limiting speed.

It is therefore the object of the present invention to provide, in simple manner, a variation in the geometry of a confluent nozzle, so that the operational conditions of the turboshaft engine are as close as possible to the ideal conditions.

SUMMARY OF THE PRESENT INVENTION

To that end, according to the invention, the double-flow turboshaft engine with confluent nozzle, i.e. of the type comprising a central generator emitting via its outlet orifice a flow of hot gas and an annular bypass duct which surrounds said central generator and through which passes a bypass flow of relatively cold gas, said flows of gas being freely confluent within said nozzle which extends said annular duct in convergent manner beyond the outlet orifice of said central generator, is noteworthy in that it comprises controlled means for peripherally varying the passage of the flux of relatively cold gas in said annular bypass duct, with a view to compensating, at least partly, the degradation of the performances of said turboshaft engine when they are limited either by the maximum operational temperature or by the maximum power of operation, but not by these two conditions simultaneously.

It will be noted that:

1. Since said controlled means for variation are disposed in the annular bypass duct, they are subjected only to the relatively low temperature of the bypass flow and not to the high temperature of the flow of hot gas coming from the central generator. The construction thereof may therefore be relatively light and inexpensive, and their operation is particularly reliable.

2. Paradoxically, it is by reducing the geometrical section of passage of the cold flow that improved performances upon take-off during hot weather will be obtained. In fact, it might be thought that this restriction decreases the supply of relatively cold gas and brings about a general increase in the temperatures. In fact, as will be shown hereinafter, this restriction of the cold flow brings about an opening of the outlet section of the hot flow, which brings about the desired reduction of the operational temperature of the gas generator. It will therefore be possible to increase the speed of rotation until the limiting temperature has been re-established, and it is finally this increase in the power which will increase the flow of the cold gases as well as the thrust.

3. Turboshaft engines provided with variable nozzles are already known. For example, in these known variable nozzles, so-called "lobes" are articulated about the central hot gas orifice and overlap one another more or less as a function of the demands of the regulation of the turboshaft engine. It will be noted that the solution consisting in directly adjusting the central hot section is forcibly heavy and expensive, since the mechanical members constituting them must operate at high temperatures, of the order of 500° C. for example. On the contrary, as is mentioned in point 1 above, the device of the invention is placed in the cold part of the engine and therefore does not present these drawbacks.

It is an essential feature of the present invention to act on the cold flow only in order to obtain a modification of the characteristics of the cold flow and of the hot flow.

Said controlled variation means of the invention are preferably located in the vicinity of the opening of said annular bypass duct in said confluent nozzle. In this way, the variation of the section of passage of the cold flow is located in the vicinity of the plane at which the confluence of the two flows begins.

In order to benefit entirely from the ambient conditions at moderate temperature, it is, of course, advantageous if said controlled variation means are actuated by actuation means housed in the thickness of the outer wall of said annular duct.

Said controlled variation means are advantageously constituted by a plurality of individual mobile bodies, preferably sectioned, distributed on the periphery of said annular bypass duct.

The number and dimension of these individual sectioned bodies are adapted to each particular case of turboshaft engine and the conditions of use envisaged therefor. The control of these individual mobile bodies, i.e. their positioning in the annular bypass duct or retraction therefrom, may be overall (in which case they are all controlled simultaneously and identically) or individual. They may also be controlled in individual groups. Moreover, this control may be monitored by the regulation of the engine (in which case it is automatic) or may more simply be left to the aircraft pilot's discretion. Finally, the control of each individual mobile body may be progressive (in order to vary the proportion of the section of the duct obturated) or of the all or nothing type. In addition, these individual mobile bodies may be regularly spaced around the axis of the engine, or be concentrated in a particular circumferential zone of said bypass duct.

In a first advantageous embodiment, said individual mobile bodies are mobile between a retracted position, for which they are housed in the thickness of the outer wall of said annular duct, and an extended position, for which they extend inside said annular duct. In that case, said individual mobile bodies advantageously pass by rotation from one of their positions to the other. Such a rotation may be of the order of 180°.

According to a second advantageous embodiment, said individual mobile bodies are mobile between a retracted position for which they project inside the outlet orifice of said nozzle, and an extended position for which they extend inside said annular duct. In that case, said individual mobile bodies advantageously pass by translation from one of their positions to the other.

When the improvement according to the invention is employed with a view to overcoming the drawbacks of take-off of an aircraft under overheated ambient conditions (as mentioned hereinabove and hereinafter), said extended and retracted positions correspond, for the above two embodiments, respectively to the position of take-off and to the position of cruise of said aircraft. It will be noted that, in said second embodiment, in retracted or cruise position, said individual mobile bodies also partially restrict the outlet section of the confluent nozzle, thus allowing complementary optimalization of the performances of the engine in cruise flight.

In the event of said confluent nozzle comprising, in known manner, means for mixing the hot and cold flows constituted by convolutions made on the periphery of the exhaust nozzle of the central generator and forming between each pair thereof a channel for guiding the gas from the cold flow towards the hot flow, it is advantageous if, in extended position, each of said individual mobile bodies is located opposite one of said guide channels.

BRIEF DESCRIPTION OF THE DRAWING

The invention will be more readily understood on reading the following description with reference to the accompanying drawings, in which:

FIG. 1 is a schematic view in axial section of a known confluent nozzle for double-flow turboshaft engine;

FIGS. 2 and 3 are respectively transverse sections along lines II—II to III—III of FIG. 1;

FIG. 4 is a schematic view in axial section of a confluent nozzle according to the present invention;

FIGS. 5 and 6 are respectively transverse sections along lines V—V and VI—VI of FIG. 4;

FIGS. 7 and 8 illustrate, respectively, in schematic partial axial and transverse sections, a first embodiment of the invention, the mobile restriction bodies being in retracted position;

FIGS. 9 and 10 illustrate, respectively, in schematic partial axial and transverse sections, said first embodiment of the invention, the mobile restriction bodies being in extended position;

FIG. 11 illustrates in schematic, partial axial section, a second embodiment of the invention;

FIG. 12 is a schematic transverse view of an embodiment applied to a confluent mixing nozzle.

DETAILED DESCRIPTION OF THE INVENTION

Referring now to the drawings, the rear part of a double-flow turboshaft engine, shown schematically in FIG. 1, comprises a central generator 1 emitting via its outlet orifice 2 a flow of hot gas (arrows 3) and an annular bypass duct 4 which surrounds said central generator 1 and through which passes a bypass flow of relatively cold gas (arrows 5) generated by a fan (not shown). The outer wall 6 of the annular duct 4 extends rearwardly beyond the plane of the outlet orifice 2 of the central generator 1 to form a confluent convergent nozzle 7 terminating towards the rear of the turboshaft engine in an outlet orifice 8. Within the confluent nozzle 7, the central hot flow 3 is surrounded by the cold flow 5 and the two flows are separated by a convergent fluid separation surface 9.

In the plane of the outlet orifice 2 of the central generator 1 (cf. also FIG. 2), the section of the hot flow 3 is equal to the section S2 of said outlet orifice 2, whilst the section of the cold flow 5 is equal to the annular section S4 of the bypass duct 4 through this plane. However, the outlet sections effectively controlling the expansion of the gaseous flows in the confluent nozzle 7 and the exhaust thereof out of said nozzle lie in the plane of the outlet orifice 8 of the nozzle 7 and are respectively smaller than sections S2 and S4. In fact, the central hot flow 3 escapes through the central part 10 of the orifice 8 limited by the section of the fluid separation surface 9 through the plane of said orifice 8, whilst the cold flow 5 escapes through the annular peripheral part 11 of said orifice 8, included between the fluid separation surface 9 and the contour of the orifice 8, the respective sections S10 and S11 of said central part 10 and peripheral part 11 of the orifice 8 being respectively smaller than sections S2 and S4 (cf. also FIG. 3).

In operation, the division of the total section S8 of orifice 8 between section S10 and section S11 depends on the relative pressures of the hot and cold flows, 3 and 5 respectively, which determine the position of the fluid separation wall 9.

In order to understand the invention more readily, it will now be assumed (cf. FIGS. 4 and 5) that an annular obstacle 12 is disposed in the annular duct 4, in the plane of the outlet orifice 2 of the generator 1, and that this annular obstacle 12 obturates the outer peripheral part of said duct 4 in order to allow the cold flow 5 only an annular passage 13, of section S13, around orifice 2. It is furthermore assumed that the inner diameter of the annular obstacle 12 is equal to the diameter of the outlet orifice 8 of the nozzle 7.

Under these conditions, the total section S2+S13 available for the passage of the flows 3 and 5 in the plane of the orifice 2 of the generator 1 is just equal to the total outlet section S8 in the plane of the orifice 8 of the nozzle 7. Consequently, within the cylindrical channel thus formed, no expansion can occur for flows 3 and 5 and these two flows will conserve in the nozzle 7 the conditions of pressure and of speed respectively attained in the plane of orifice 2 of the generator 1. The fluid separation surface 9 will therefore be cylindrical, with the result that, in the plane of the outlet orifice 8 of the nozzle, the central part 10 takes a new section S10' equal to S2, therefore greater than S10, whilst the annular peripheral part 11 takes a new section S11' equal to S13, and therefore smaller than S11. The central part 10 has thus expanded, whilst the peripheral annular part 11 has retracted.

More generally, it is therefore seen that any peripheral variation in the section of passage S4 brings about changes in opposite directions in the effective exhaust sections S10 and S11. Now, an increase in the central section S10 leads to a lowering of the operational temperature of the gas generator, all else being equal. It is therefore deduced that the presence of obstacle 12 makes it possible to lower the operational temperature of the generator 1, which, a priori, is surprising, as mentioned hereinabove.

The present invention takes full advantage of this discovery to improve the performances of a double-flow turboshaft engine with confluent nozzle, when such performances are degraded since the gas generator has prematurely attained either its limiting operational temperature or its limiting speed of rotation. A characteristic (but non-limiting) example of application of the invention is for example take-off, in a hot environment, of an aircraft equipped with such a turboshaft engine. In fact, if the turboshaft engine is provided to furnish its maximum take-off power with ambient air at 20° C., this power cannot be attained if the ambient temperature attains for example 50° C., which may be the case in a hot climate. This is due to the fact that, under these conditions, the turboshaft engine attains its limiting temperature before attaining its operational speed. For example, if, for ambient air at 20° C., the maximum power corresponds to a speed of 21,000 rpm, it will be noted that, in ambient air at 50° C., the turboshaft engine cannot exceed the speed of 19000 rpm. This results in a significant loss of power, which may be extremely detrimental to optimum take-off of the aircraft. Thanks to the invention, and for the same limiting operational temperature, it will be possible to re-establish for example a speed of 20,000, rpm for ambient air at 50° C., which corresponds to a considerable compensation of the above-mentioned degradation of the performances.

The first embodiment of the invention is schematically illustrated in FIGS. 7 to 10, in which FIGS. 8 and 10 are respectively schematic sections along lines VIII-—VIII and X—X of FIGS. 7 and 9. These FIGS. 7 to 10 show the structure of the outer wall 6 of the annular bypass duct 4 and of the confluent nozzle 7. This outer wall 6 comprises two skins 6a and 6b separated from each other and connected by frames 14. In FIGS. 8 and 10, the inner skin 6b has not been shown in order to render the drawings clearer; consequently, only the outer skin 6a is visible.

Opposite the outlet orifice 2 of generator 1, the skins 6a and 6b and two consecutive frames 14 determine caissons 15, inside which are mounted sectioned mobile bodies 16. Each of the bodies 16 is pivotally mounted about pivots 17 swivelling in bearings fast with said caissons 15. The latter comprise, in the inner skin 6b, openings 18. Under the action of actuation means (described hereinafter), each of the rotary sectioned bodies 16 may occupy a retracted position (cf. FIGS. 7 and 8), for which it is completely housed inside the corresponding caisson 15 or an extended position (cf. FIGS. 9 and 10), for which it projects inside the annular bypass duct 4, passing partly through the corresponding opening 18.

Passage from each of said positions to the other is effected by rotation through 180° of the sectioned bodies 16 about their pivots 17.

To that end, the means for actuating the sectioned bodies 16 in rotation may comprise a pinion 19 fast with the pivots 17, an annular gear 20 meshing with the pinions 19 of all or several of the sectioned bodies 16, one or more jacks 21 abutting on one side on the structure of the turboshaft engine and connected on the other to the ring 20 and one or more antagonistic springs 22. In FIGS. 8 and 10, in order to render the drawings clearer, the jacks 21 and the springs 22 have been shown outside the caissons 15. In fact, they are advantageously disposed in said caissons 15.

By control of the extension of jacks 21 directly by the pilot or by the turboshaft engine regulation device, it is possible to rotate the ring 20 and therefore the rotary sectioned bodies 16, against the action of springs 22, to pass said rotary bodies from the retracted position (FIGS. 7 and 8) to the extended position (FIGS. 9 and 10). Return from extended position to retracted position is obtained under the action of the retraction of jacks 21 and springs 22.

In the variant embodiment of FIG. 11, sectioned bodies 23, mobile in translation under the action of actuation means (not shown) are partially housed in caissons 24 made between the skins 6a and 6b of wall 6 and project inwardly of said turboshaft engine, passing through a slot 25 made in the inner skin 6b. The direction of translation of said sectioned bodies 23 is substantially longitudinal. These sectioned bodies 23 may occupy a retracted position (shown in solid lines) for which they lie at the level of the outlet orifice 8 of the nozzle 7 which they partly obturate or an extended position (shown in broken lines) for which they lie at the level of outlet orifice 2 of the central generator 1, partly obturating the annular bypass duct 4.

FIG. 12 schematically shows the end of the exhaust nozzle 1' of the generator 1 when said nozzle is of the mixing type. This nozzle 1' comprises on its periphery a plurality of convolutions 26 defining therebetween channels 27 adapted to guide part of the cold flow 5 circulating in the annular bypass duct 4 towards the hot flow 3, which results in a partial mixing of these two flows in the confluent nozzle 7. In that case, each of the mobile sectioned bodies 28, which may be the bodies 16 or 23, are advantageously located opposite a cold air guide channel 27.

What is claimed is:

1. A confluent nozzle type double-flow turboshaft engine capable of providing increased output thrust without exceeding operating temperature limitations to compensate for performance degradation of the engine when it is operating in a high ambient temperature environment, comprising:
  a central generator emitting at its outlet orifice a hot gas flow;
  an annular bypass duct surrounding said central generator and extending beyond said outlet orifice of said central generator to form a nozzle past the outlet orifice of said central generator to provide thereby a bypass cold gas flow passing through said bypass duct which is confluent with the hot gas flow of said central generator within said nozzle;

selectively operable means in said bypass duct substantially at the plane of said outlet orifice of said central generator for partially and in a substantially circumferential manner obstructing said bypass duct about its outer circumference, and at a substantially coplanar relationship with the outlet orifice of the central generator to reduce the annular area through which said cold gas flow passes out of said nozzle;

whereby the ratio of the cross-sectional axis of the circular area through which said hot gas flow is emitted out of said nozzle relative to the annular area through which said cold gas flow passes is increased to permit an increase in the output thrust of said engine without exceeding its operational temperature limitation.

2. The turboshaft engine of claim 1 wherein said selectively operable means are actuated by actuation means housed in the thickness of the outer wall of said annular duct.

3. The turboshaft engine of claim 1, wherein said selectively operable means comprise a plurality of individual mobile bodies distributed about the periphery of said annular bypass duct.

4. The turboshaft engine of claim 3 in which said confluent nozzle comprises means for mixing the hot and cold flows constituted by convolutions made on the periphery of the exhaust nozzle of the central generator and forming between each pair thereof a channel for guiding the gas from the cold flow towards the hot flow, wherein, in extended position, each of said individual mobile bodies is located opposite one of said guide channels.

5. The turboshaft engine of claim 3, wherein said individual mobile bodies are mobile between a retracted position, for which they are housed in the thickness of the outer wall of said annular duct, and an extended position, for which they extend inside said annular duct.

6. The turboshaft engine of claim 5, wherein said individual mobile bodies pass by rotation from one of their positions to the other.

7. The turboshaft engine of claim 3, wherein said individual mobile bodies are mobile between a retracted position for which they project inside the outlet orifice of said nozzle, and an extended position for which they extend inside said annular duct.

8. The turboshaft engine of claim 7, wherein said individual mobile bodies pass by translation from one of their positions to the other.

9. In a confluent nozzle type double-flow turboshaft engine having a central generator emitting at its outlet orifice a hot gas flow, said central generator being surrounded by an annular bypass duct through which a cold gas flow passes, said annular bypass duct extending beyond the outlet orifice of said central generator to form a nozzle past said outlet orifice of said central generator, said hot and cold flows being confluent within said nozzle, a method of compensating for degradation of the performance of said engine when said engine is operating in a high temperature environment, comprising the step of:

selectively obstructing substantially the outer circumference of said bypass duct substantially at the plane of said outlet orifice of said central generator to reduce the area through which said cold gas flow passes for effecting an increase of the ratio of the circular area of said hot gas flow in relation to the annular area of the cold gas flow in said bypass duct;

thereby permitting an increase in the engine thrust under high ambient temperature conditions without exceeding the engine's operational temperature limitation.

* * * * *